(12) United States Patent
Franks

(10) Patent No.: US 6,446,656 B1
(45) Date of Patent: Sep. 10, 2002

(54) DUAL INLET BACKFLOW PREVENTION VALVE

(76) Inventor: George W. Franks, 1917 J Rd., Fruita, CO (US) 81521-9393

(*) Notice: Subject to any disclaimer, the term of this patent is extended or adjusted under 35 U.S.C. 154(b) by 0 days.

(21) Appl. No.: 09/865,303

(22) Filed: May 25, 2001

(51) Int. Cl.$^7$ .................. F16K 31/08; F16K 11/044; F16K 11/056
(52) U.S. Cl. .................. 137/112; 137/597; 251/65
(58) Field of Search .................. 137/112, 113, 137/114, 597; 251/65

(56) References Cited

U.S. PATENT DOCUMENTS

| | | | |
|---|---|---|---|
| 2,501,755 A | * | 3/1950 | Bent .................. 137/113 |
| 2,778,316 A | * | 1/1957 | Haight et al. .................. 137/112 |
| 2,834,371 A | | 5/1958 | Liljestrand |
| 3,447,556 A | * | 6/1969 | Howeth .................. 137/112 |
| 3,830,252 A | | 8/1974 | Follett |
| 4,513,776 A | | 4/1985 | Chen |
| D287,043 S | | 12/1986 | Hughes |
| 4,640,391 A | | 2/1987 | Maehara et al. |
| 4,944,327 A | | 7/1990 | Gyben |

* cited by examiner

*Primary Examiner*—Stephen M. Hepperle

(57) ABSTRACT

A dual inlet backflow prevention valve for preventing mixture between two inlets. The dual inlet backflow prevention valve includes a tubular member having a first portion, a second portion and a middle portion. A first opening extends through the tubular member along a longitudinal axis of the tubular member. Each of the first and second portions defines an inlet duct. A second opening extends into a peripheral wall of the middle portion and into the opening and defines an outlet duct. A pair of saddles is positioned in the middle portion and spaced from each other. Each of the saddle has an aperture extending therethrough and being coaxial with the first opening. Each of the saddles comprises a magnetized material. A bearing is positioned in the middle portion and comprises a metal material. The bearing has a diameter greater than an inner diameter of the apertures in of the saddles.

6 Claims, 1 Drawing Sheet

US 6,446,656 B1

DUAL INLET BACKFLOW PREVENTION VALVE

BACKGROUND OF THE INVENTION

1. Field of the Invention

The present invention relates to backflow valve devices and more particularly pertains to a new dual inlet backflow prevention valve for preventing mixture between two inlets.

2. Description of the Prior Art

The use of backflow valve devices is known in the prior art. More specifically, backflow valve devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,944,327; U.S. Pat. No. 4,513,776; U.S. Pat. No. 2,834,371; U.S. Pat. No. 3,830,252; U.S. Pat. No. 4,640,391; and U.S. Des. Pat. No. 287,043.

While these devices fulfill their respective, particular objectives and requirements, the aforementioned patents do not disclose a new dual inlet backflow prevention valve. The inventive device includes a tubular member having a first portion, a second portion and a middle portion. A first opening extends through the tubular member along a longitudinal axis of the tubular member. Each of the first and second portions defines an inlet duct. A second opening extends into a peripheral wall of the middle portion and into the opening and defines an outlet duct. A pair of saddles is positioned in the middle portion and spaced from each other. Each of the saddle has an aperture extending therethrough and being coaxial with the first opening. Each of the saddles comprises a magnetized material. A bearing is positioned in the middle portion and comprises a metal material. The bearing has a diameter greater than an inner diameter of the apertures in of the saddles.

In these respects, the dual inlet backflow prevention valve according to the present invention substantially departs from the conventional concepts and designs of the prior art, and in so doing provides an apparatus primarily developed for the purpose of preventing mixture between two inlets.

SUMMARY OF THE INVENTION

In view of the foregoing disadvantages inherent in the known types of backflow valve devices now present in the prior art, the present invention provides a new dual inlet backflow prevention valve construction wherein the same can be utilized for preventing mixture between two inlets.

The general purpose of the present invention, which will be described subsequently in greater detail, is to provide a new dual inlet backflow prevention valve apparatus and method which has many of the advantages of the backflow valve devices mentioned heretofore and many novel features that result in a new dual inlet backflow prevention valve which is not anticipated, rendered obvious, suggested, or even implied by any of the prior art backflow valve devices, either alone or in any combination thereof.

To attain this, the present invention generally comprises a tubular member having a first portion, a second portion and a middle portion. A first opening extends through the tubular member along a longitudinal axis of the tubular member. Each of the first and second portions defines an inlet duct. A second opening extends into a peripheral wall of the middle portion and into the opening and defines an outlet duct. A pair of saddles is positioned in the middle portion and spaced from each other. Each of the saddle has an aperture extending therethrough and being coaxial with the first opening. Each of the saddles comprises a magnetized material. A bearing is positioned in the middle portion and comprises a metal material. The bearing has a diameter greater than an inner diameter of the apertures in of the saddles.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dual inlet backflow prevention valve apparatus and method which has many of the advantages of the backflow valve devices mentioned heretofore and many novel features that result in a new dual inlet backflow prevention valve which is not anticipated, rendered obvious, suggested, or even implied by any of the prior art backflow valve devices, either alone or in any combination thereof.

It is another object of the present invention to provide a new dual inlet backflow prevention valve which may be easily and efficiently manufactured and marketed.

It is a further object of the present invention to provide a new dual inlet backflow prevention valve which is of a durable and reliable construction.

An even further object of the present invention is to provide a new dual inlet backflow prevention valve which is susceptible of a low cost of manufacture with regard to both materials and labor, and which accordingly is then susceptible of low prices of sale to the consuming public, thereby making such dual inlet backflow prevention valve economically available to the buying public.

Still yet another object of the present invention is to provide a new dual inlet backflow prevention valve which provides in the apparatuses and methods of the prior art some of the advantages thereof, while simultaneously overcoming some of the disadvantages normally associated therewith.

Still another object of the present invention is to provide a new dual inlet backflow prevention valve for preventing mixture between two inlets.

Yet another object of the present a tubular member having a first portion, a second portion and a middle portion. A first opening extends through the tubular member along a longitudinal axis of the tubular member. Each of the first and second portions defines an inlet duct. A second opening extends into a peripheral wall of the middle portion and into the opening and defines an outlet duct. A pair of saddles is positioned in the middle portion and spaced from each other. Each of the saddle has an aperture extending therethrough and being coaxial with the first opening. Each of the saddles comprises a magnetized material. A bearing is positioned in the middle portion and comprises a metal material. The bearing has a diameter greater than an inner diameter of the apertures in of the saddles.

Still yet another object of the present invention is to provide a new dual inlet backflow prevention valve that only allows fluid outwardly through the outlet duct when the requisite pressure is applied to move the bearing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
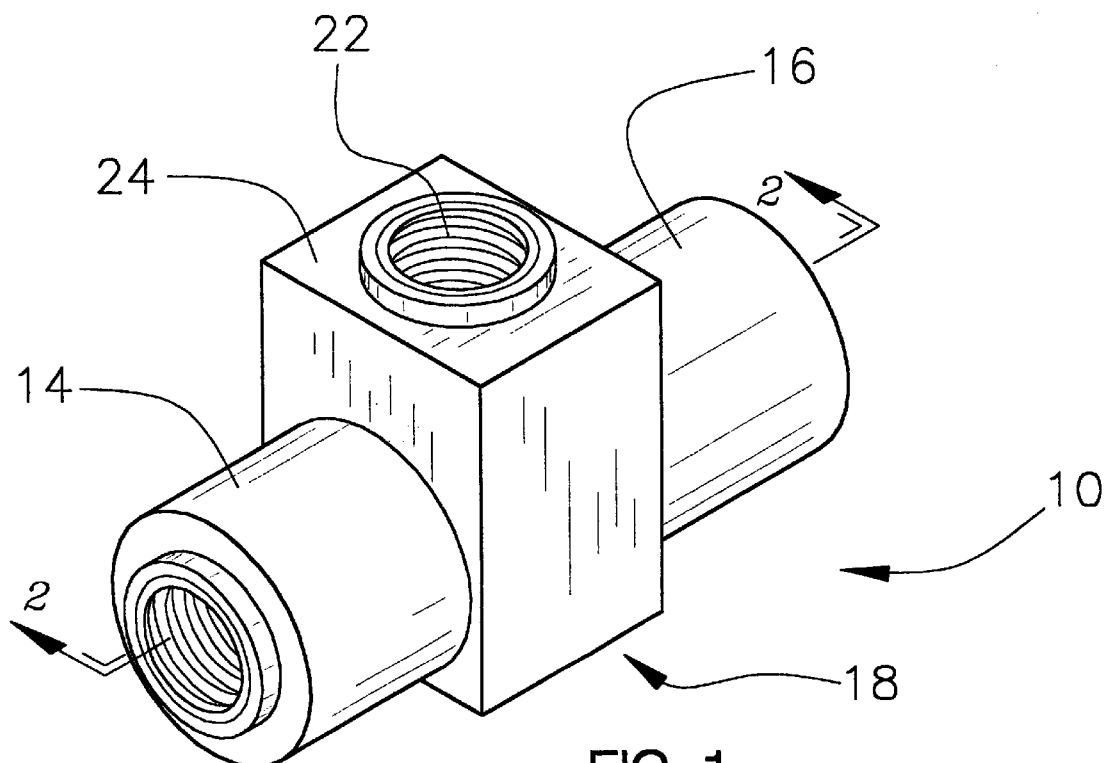
FIG. 1 is a schematic perspective view of a new dual inlet backflow prevention valve according to the present invention.
Figure 2:
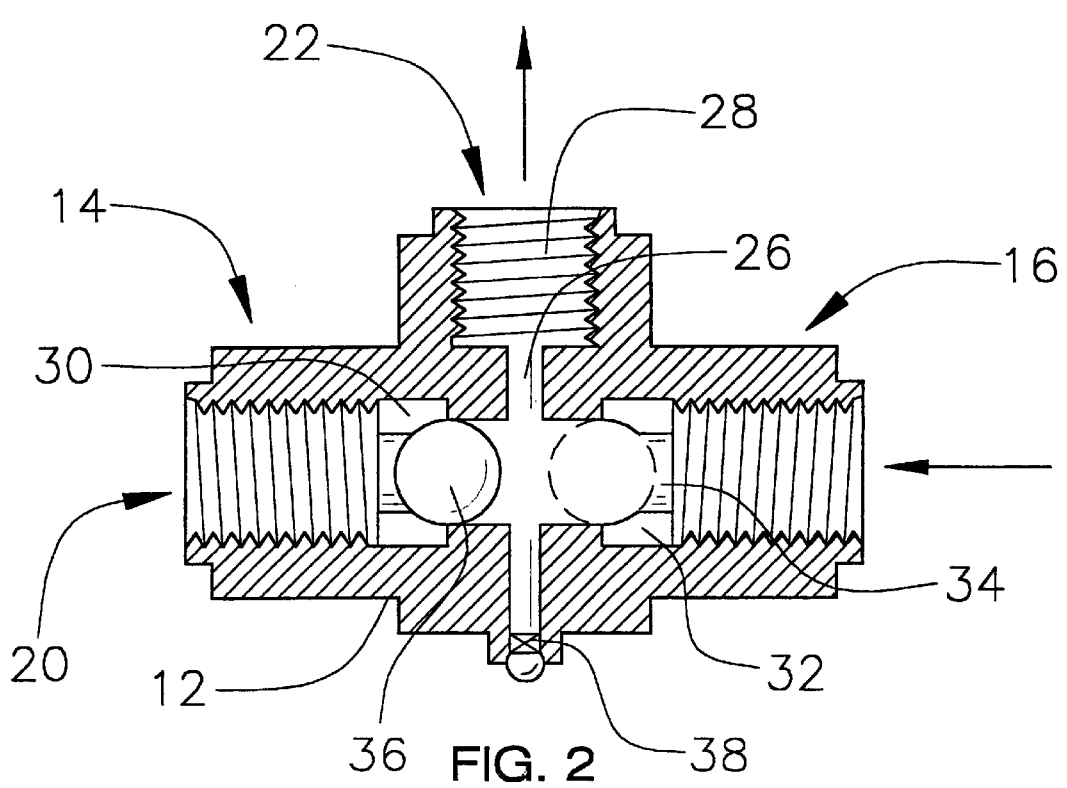
FIG. 2 is a schematic cross-sectional view taken along line 2—2 of the present invention.

With reference now to the drawings, and in particular to FIGS. 1 and 2 thereof, a new dual inlet backflow prevention valve embodying the principles and concepts of the present invention and generally designated by the reference numeral 10 will be described.

As best illustrated in FIGS. 1 and 2, the dual inlet backflow prevention valve 10 generally comprises a tubular member 12 that is elongated and has a first portion 14, a second portion 16 and a middle portion 18 positioned between the first 14 and second 16 portions. A first opening 20 extends through the tubular member 12 along a longitudinal axis of the tubular member 12 and through opposite ends of the tubular member 12. The first opening 20 in the first 14 and second 16 portions is threaded. Each of the first 14 and second 16 portions defines an inlet duct. A second opening 22 extends into a peripheral wall 24 of the middle portion 18 and into the first opening 20. The second opening 22 is threaded and defines an outlet duct. The second opening 22 has a proximal portion 26 and a distal portion 28 with respect to the first opening 20.

A pair of saddles 30, 32 are positioned in the middle portion 18 and are spaced from each other. Each of the saddles 30, 32 comprises an annular member having an outer surface attached to a peripheral wall of the first opening 20. A first 30 of the saddles is positioned at a juncture of the middle portion 18 and the first portion 14. A second 32 of the saddles is positioned at a juncture of the middle portion 18 and second portion 16. Each of the saddles 30, 32 comprises a magnetized material.

A bearing 36 is positioned in the middle portion 18 and comprises a metal material. The bearing 36 has a diameter greater than an inner diameter, or aperture 34, of the saddles 30, 32 and is magnetically attracted to the saddles 30, 32 such that the bearing 36 forms a seal with an abutting one of the saddles. The proximal portion 26 of the second opening 22 has a diameter less than half a diameter of the bearing 36.

A valve 38 is in fluid communication with the middle portion 18 for selectively lowering pressure in the middle portion 18. The valve 38 being a conventional bleeder valve.

In use, each of a pair of inlet tubes may be fluidly coupled to each of the inlet ducts. Which ever inlet tube provides greater fluid pressure will urge the bearing 36 toward the other saddle 30, 32 so that back flow into the lower pressured tube does not occur. In the case where pressure is low in both of the tubes, the bearing 36 remains in one of the saddles due to magnetic forces such that no mixing between the tubes takes place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A back-flow prevention valve having a pair of inlet ducts, said device comprising:

a tubular member being elongated and having a first portion, a second portion and a middle portion positioned between said first and second portions, a first opening extending through said tubular member along a longitudinal axis of said tubular member and through opposite ends of said tubular member, each of said first and second portions defining an inlet duct, a second opening extending into a peripheral wall of said middle portion and into said opening, said second opening defining an outlet duct;

a pair of saddles being positioned in said middle portion and being spaced from each other, each of said saddle having an aperture extending therethrough, said apertures being coaxial with said first opening, each of said saddles comprising a magnetized material;

a bearing being positioned in said middle portion and comprising a metal material, said bearing having a diameter greater than an inner diameter of said apertures in of said saddles; and a valve being in fluid communication with said middle portion for selectively lowering pressure in said middle portion.

2. A back-flow prevention valve having a pair of inlet ducts, said device comprising:

a tubular member being elongated and having a first portion, a second portion and a middle portion positioned between said first and second portions, a first opening extending through said tubular member along a longitudinal axis of said tubular member and through opposite ends of said tubular member, the first opening in said first and second portions being threaded, each of said first and second portions defining an inlet duct, a second opening extending into a peripheral wall of said middle portion and into said opening, said second opening being threaded and defining an outlet duct, said second opening having a proximal portion and a distal portion with respect to said first opening;

a pair of saddles being positioned in said middle portion and being spaced from each other, each of said saddles comprising an annular member having an outer surface attached to a peripheral wall of said first opening, a first of said saddles being positioned at a juncture of said middle portion and said first portion, a second of said saddles being positioned at a juncture of said middle portion and second portion, each of said saddles comprising a magnetized material;

a bearing being positioned in said middle portion and comprising a metal material, said bearing having a diameter greater than an inner diameter of said saddles and being magnetically attracted to said saddles such that said bearing forms a seal with an abutting one of said saddles, said proximal portion of said second opening having a diameter less than half a diameter of said bearing; and a valve being in fluid communication with said middle portion for selectively lowering pressure in said middle portion.

3. The back-flow prevention valve as in claim 1, wherein the first opening in said first and second portions is threaded.

4. The back-flow prevention valve as in claim 1, wherein said second opening is threaded.

5. The back-flow prevention valve as in claim 1, wherein said second opening has a proximal portion and a distal portion with respect to said first opening, said proximal portion of said second opening having a diameter less than half a diameter of said bearing.

6. The back-flow prevention valve as in claim 1, wherein each of said saddles comprises an annular member having an outer surface attached to a peripheral wall of said first opening, a first of said saddles being positioned at a juncture of said middle portion and said first portion, a second of said saddles being positioned at a juncture of said middle portion and second portion.

* * * * *